(12) United States Patent
Kang et al.

(10) Patent No.: US 8,782,327 B1
(45) Date of Patent: Jul. 15, 2014

(54) SYSTEM AND METHOD FOR MANAGING EXECUTION OF INTERNAL COMMANDS AND HOST COMMANDS IN A SOLID-STATE MEMORY

(75) Inventors: Ho-Fan Kang, Aliso Viejo, CA (US); Lan D. Phan, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 492 days.

(21) Appl. No.: 12/777,771

(22) Filed: May 11, 2010

(51) Int. Cl.
*G06F 12/00* (2006.01)

(52) U.S. Cl.
USPC .......................................... 711/103; 711/170

(58) Field of Classification Search
USPC ....................................................... 711/103
See application file for complete search history.

(56) References Cited

U.S. PATENT DOCUMENTS

| | | | |
|---|---|---|---|
| 5,093,780 A | 3/1992 | Sunahara | |
| 5,123,094 A | 6/1992 | MacDougall | |
| 5,634,099 A | 5/1997 | Andrews et al. | |
| 6,088,740 A | 7/2000 | Ghaffari et al. | |
| 6,205,521 B1 | 3/2001 | Schumann | |
| 6,338,122 B1 | 1/2002 | Baumgartner et al. | |
| 6,475,062 B1 | 11/2002 | Kubota et al. | |
| 6,678,801 B1 | 1/2004 | Greim et al. | |
| 6,757,781 B2 | 6/2004 | Williams et al. | |
| 6,760,820 B2 | 7/2004 | Henson et al. | |
| 6,862,151 B2 | 3/2005 | Hoskins et al. | |
| 6,969,989 B1 | 11/2005 | Mei | |
| 7,082,494 B1 | 7/2006 | Thelin et al. | |
| 7,114,041 B2 | 9/2006 | Hammitt et al. | |
| 7,174,467 B1 | 2/2007 | Helms et al. | |
| 7,310,699 B2 | 12/2007 | Sinclair | |
| 7,313,641 B2 | 12/2007 | Koch et al. | |
| 7,315,917 B2 | 1/2008 | Bennett et al. | |
| 7,340,580 B2 | 3/2008 | Kinoshita | |
| 7,363,396 B2 | 4/2008 | Liu et al. | |
| 7,363,421 B2 | 4/2008 | Di Sena et al. | |
| 7,366,826 B2 | 4/2008 | Gorobets et al. | |
| 7,406,547 B2 | 7/2008 | Haines et al. | |
| 7,424,587 B2 | 9/2008 | Caulkins et al. | |
| 7,441,054 B2 | 10/2008 | Wu et al. | |
| 7,441,067 B2 | 10/2008 | Gorobets et al. | |
| 7,457,903 B2 | 11/2008 | Purdham et al. | |
| 7,487,286 B2 | 2/2009 | Nagano et al. | |
| 7,582,868 B2 | 9/2009 | Jiang et al. | |
| 7,831,783 B2 | 11/2010 | Pandit et al. | |
| 2001/0034809 A1 | 10/2001 | Ogawa | |

(Continued)

OTHER PUBLICATIONS

Taratorin, Alexander M. and Klaas B. Klassen, Observation of Recording Pole Instability in Perpendicular Recording, IEEE Transaction on Magnetics, vol. 42, No. 10, Oct. 2006, pp. 2267-2269.

(Continued)

*Primary Examiner* — Kaushikkumar Patel (57) ABSTRACT

Embodiments of the invention are directed to enable simultaneous or nearly simultaneous execution of internal and host-issued commands in a non-volatile storage subsystem while maintaining data consistency. Embodiments maintain validity information on data residing at physical addresses as well as logical to physical address mappings in the solid-state storage subsystem. In one embodiment, a controller within the storage subsystem selectively cancels internal commands that it determines to be writing data that has been rendered invalid by another command. In one embodiment, the determination is made by consulting the validity information kept by the controller in an invalid page table.

29 Claims, 6 Drawing Sheets

(56) References Cited

U.S. PATENT DOCUMENTS

| | | |
|---|---|---|
| 2002/0040413 A1 | 4/2002 | Okada et al. |
| 2002/0083111 A1 | 6/2002 | Row et al. |
| 2004/0193743 A1 | 9/2004 | Byers et al. |
| 2005/0193081 A1 | 9/2005 | Gruber et al. |
| 2005/0204187 A1* | 9/2005 | Lee et al. .................. 714/8 |
| 2006/0155917 A1 | 7/2006 | Di Sena et al. |
| 2006/0161724 A1 | 7/2006 | Bennett et al. |
| 2007/0016721 A1 | 1/2007 | Gay |
| 2007/0033332 A1 | 2/2007 | Sinclair et al. |
| 2007/0043900 A1 | 2/2007 | Yun |
| 2007/0186032 A1* | 8/2007 | Sinclair et al. ............ 711/103 |
| 2007/0186065 A1 | 8/2007 | Lee et al. |
| 2008/0082736 A1* | 4/2008 | Chow et al. .............. 711/103 |
| 2008/0091872 A1 | 4/2008 | Bennett et al. |
| 2008/0126685 A1 | 5/2008 | Danilak |
| 2008/0126719 A1 | 5/2008 | Danilak |
| 2008/0126720 A1 | 5/2008 | Danilak |
| 2008/0126891 A1 | 5/2008 | Danilak |
| 2008/0155166 A1 | 6/2008 | James et al. |
| 2008/0235443 A1 | 9/2008 | Chow et al. |
| 2008/0263305 A1 | 10/2008 | Shu et al. |
| 2008/0282024 A1* | 11/2008 | Biswas et al. ............ 711/103 |
| 2008/0288717 A1 | 11/2008 | Torabi |
| 2008/0307164 A1 | 12/2008 | Sinclair |
| 2009/0012976 A1 | 1/2009 | Kang et al. |
| 2009/0017220 A1 | 1/2009 | Muller et al. |
| 2009/0070502 A1 | 3/2009 | Noha et al. |
| 2009/0116475 A1 | 5/2009 | Krzyzanowski et al. |
| 2009/0119460 A1 | 5/2009 | Lin et al. |
| 2009/0129163 A1 | 5/2009 | Danilak |
| 2009/0150599 A1 | 6/2009 | Bennett |
| 2009/0154026 A1 | 6/2009 | Jiang et al. |
| 2009/0172250 A1* | 7/2009 | Allen et al. .................. 711/103 |
| 2009/0172258 A1 | 7/2009 | Olbrich et al. |
| 2009/0172260 A1 | 7/2009 | Olbrich et al. |
| 2009/0271562 A1 | 10/2009 | Sinclair |
| 2009/0313501 A1 | 12/2009 | Hallivuori |
| 2010/0023672 A1* | 1/2010 | Gorobets et al. ............ 711/103 |
| 2010/0037009 A1 | 2/2010 | Yano et al. |
| 2010/0185806 A1 | 7/2010 | Pruthi et al. |
| 2010/0262760 A1* | 10/2010 | Swing et al. ................ 711/103 |
| 2011/0022778 A1 | 1/2011 | Schibilla et al. |
| 2011/0055455 A1 | 3/2011 | Post et al. |
| 2011/0055458 A1* | 3/2011 | Kuehne ..................... 711/103 |
| 2011/0191566 A1 | 8/2011 | Takamiya et al. |
| 2011/0231624 A1 | 9/2011 | Fukutomi et al. |
| 2012/0239851 A1 | 9/2012 | Calvert et al. |
| 2013/0024595 A1 | 1/2013 | Subramaniyan et al. |

OTHER PUBLICATIONS http://www.anandtech.com.
Hu et al., "Write Amplification Analysis in Flash-Based Solid State Drives", SYSTOR'09, Zurich Research Laboratory, copyright 2009 IBM Corporation, downloaded on May 12, 2010 from https://www.research.ibm.com/haifa/conferences/systor2009/papers/2_2_2.pdf, 13 pages.
Office Action under U.S. Appl. No. 12/778,740 dated May 22, 2012.
Office Action under U.S. Appl. No. 12/778,740 dated Sep. 28, 2012.

* cited by examiner

MAPPING TABLE

| LBA | PHYSICAL PAGE ADDRESS |
|---|---|
| 1 | BLOCK 0: PAGE 13 |
| 2 | BLOCK 0: PAGE 14 |
| ... | ... |
| 26 | BLOCK 1: PAGE 9 |

402A

AFTER USER DATA WRITE

MAPPING TABLE

| LBA | PHYSICAL PAGE ADDRESS |
|---|---|
| 1 | BLOCK 1: PAGE 12 |
| 2 | BLOCK 0: PAGE 14 |
| ... | ... |
| 26 | BLOCK 1: PAGE 9 |

402B

INVALID PAGE TABLE

| BLOCK | PAGE ADDRESS | VALID? |
|---|---|---|
| ⋮ | ⋮ | ⋮ |
| 0 | 12 | YES |
| 0 | 13 | YES |
| 0 | 14 | NO |
| ⋮ | ⋮ | ⋮ |
| 1 | 11 | YES |
| 1 | 12 | [empty] |
| ⋮ | ⋮ | ⋮ |

404A

AFTER USER DATA WRITE

INVALID PAGE TABLE

| BLOCK | PAGE ADDRESS | VALID? |
|---|---|---|
| ⋮ | ⋮ | ⋮ |
| 0 | 12 | YES |
| 0 | 13 | NO |
| 0 | 14 | NO |
| ⋮ | ⋮ | ⋮ |
| 1 | 11 | YES |
| 1 | 12 | YES |
| ⋮ | ⋮ | ⋮ |

SYSTEM AND METHOD FOR MANAGING EXECUTION OF INTERNAL COMMANDS AND HOST COMMANDS IN A SOLID-STATE MEMORY

BACKGROUND

Solid-state storage subsystems execute many internal commands in the course of their normal operation. For example, garbage collection is frequently performed on memory blocks that may contain both valid and invalid data. When such a memory block is selected for garbage collection, the garbage collection operation copies valid data within the memory block to a new location in memory and then erases the entire memory block, making the entire block available for future data writes. In addition to garbage collection operations, solid-state storage subsystems also perform read and write operations as dictated by memory commands issued by host systems.

BRIEF DESCRIPTION OF THE DRAWINGS

Systems and methods which embody the various features of the invention will now be described with reference to the following drawings, in which.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Solid-state storage subsystems perform internal system operations such as garbage collection and wear leveling to improve performance and longevity. Embodiments of the invention are directed to managing the simultaneous or nearly simultaneous execution of internal system commands (e.g. garbage collection commands) and commands received from host systems. Executing garbage collection commands with host-issued commands improves the performance of the storage subsystem by preventing stalls that can occur as a result of the storage subsystem running out of free blocks and being forced to execute garbage collection commands to free up blocks for pending host-issued commands. However, one challenge of executing internal system commands with host system commands is maintaining data consistency while executing both types of commands. For example, a garbage collection command may be issued to read data from a certain logical location "A" that corresponds to a physical location "X" and write the data to a new physical location "Y." While the read portion of the garbage collection command is completed and the write portion is awaiting execution, a host write command may cause new data to be written to the logical location "A," thus rendering the data to be written by the pending garbage collection command outdated. If the pending garbage collection write is allowed to execute, it would write the outdated data and cause data consistency issues.

In one embodiment of the invention, a controller manages the simultaneous or nearly simultaneous execution of internal commands and host commands by maintaining validity information on data residing at physical addresses in the solid-state storage subsystem and selectively cancelling a pending internal command if it is determined that the internal command is attempting to write data that has been rendered invalid by another command (e.g. a host-issued write command or another internal command). As will be further described below, the maintenance of validity information and selective execution of internal commands help ensure data consistency while allowing for the simultaneous or nearly simultaneous execution of internal commands and host commands. Although the present disclosure illustrates various embodiments by using garbage collection command examples, the disclosure is not so limited and is applicable to managing the execution of any type of internal system commands (e.g. wear leveling commands) with host-issued commands.

System Overview

Figure 1:
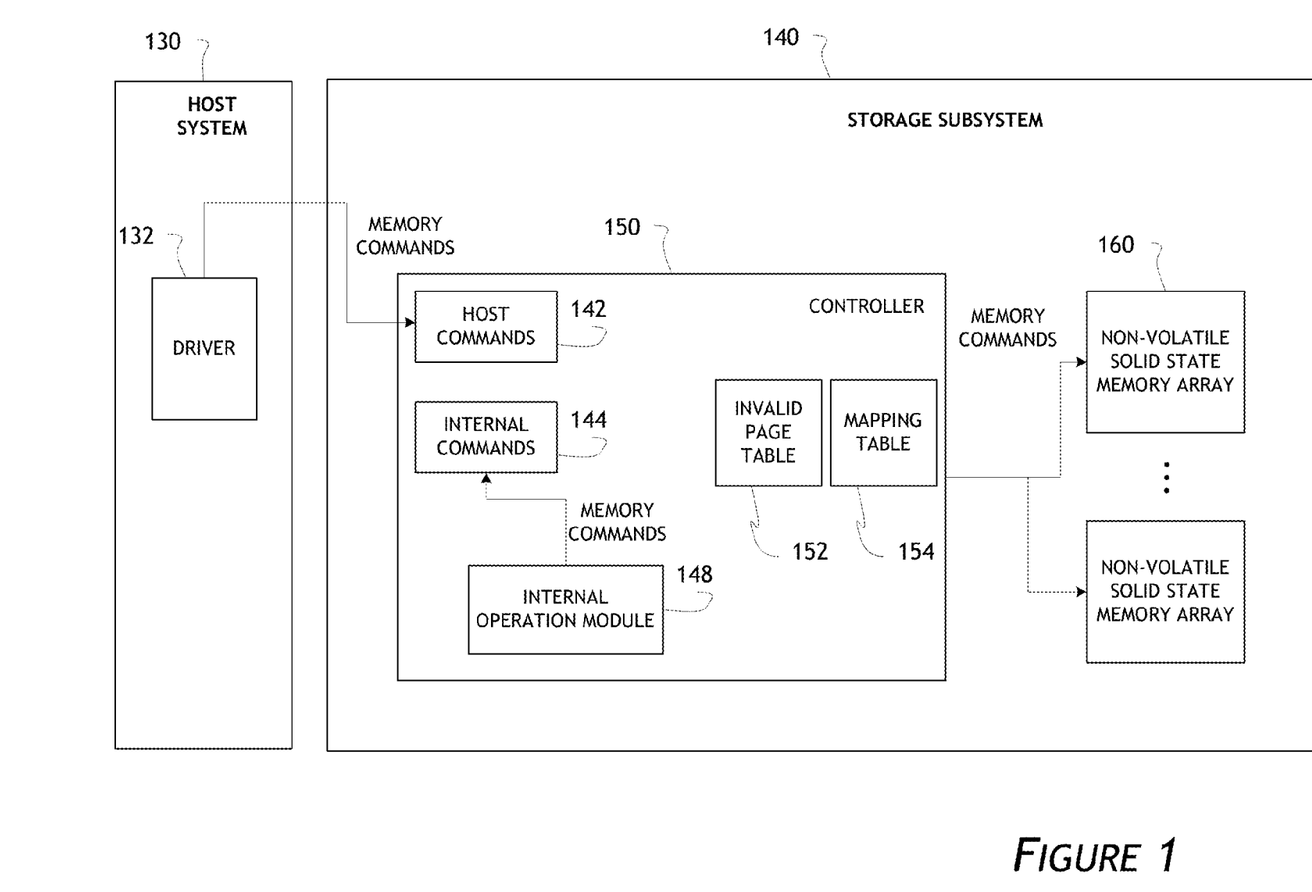
FIG. 1 is a block diagram illustrating a storage subsystem according to one embodiment.

FIG. 1 is a block diagram illustrating a storage subsystem embodiment. As shown, a storage subsystem 140 includes a controller 150, which in turn includes a host command queue 142, an internal command queue 144, and an internal operation module 148. In one embodiment, the host command queue 142 receives memory commands from a driver 132 residing within a host system 130 and the internal command queue 144 receives commands from the internal operation module 148, which may manage various internal operations such as garbage collection and/or wear leveling. In other embodiments, the commands from the driver 132 and the internal operation module 148 are received into a single queue for execution. The memory commands from the driver 132 may include write and read commands issued by the host system 130, while memory commands from the internal operation module 148 may include commands used for garbage collection. As further shown in FIG. 1, in one embodiment, the controller 150 executes the commands in the host command queue 142 and the internal command queue 144 in one or more non-volatile solid-state memory arrays 160.

In one embodiment, the controller 150 also maintains several data structures to help ensure that commands from the host command queue 142 and the internal command queue 144 are executed in a manner as further described herein to maintain data consistency. The data structures include, in one embodiment, an invalid page table 152 and a mapping table 154. In one embodiment, the invalid page table 152 keeps track of the validity of data located at physical page addresses throughout the non-volatile solid-state memory arrays 160, while the mapping table 154 keeps track of the correspondence between logical block addresses (LBA) and physical addresses in the non-volatile solid-state memory arrays 160.

Command Execution Examples

Figure 2A:
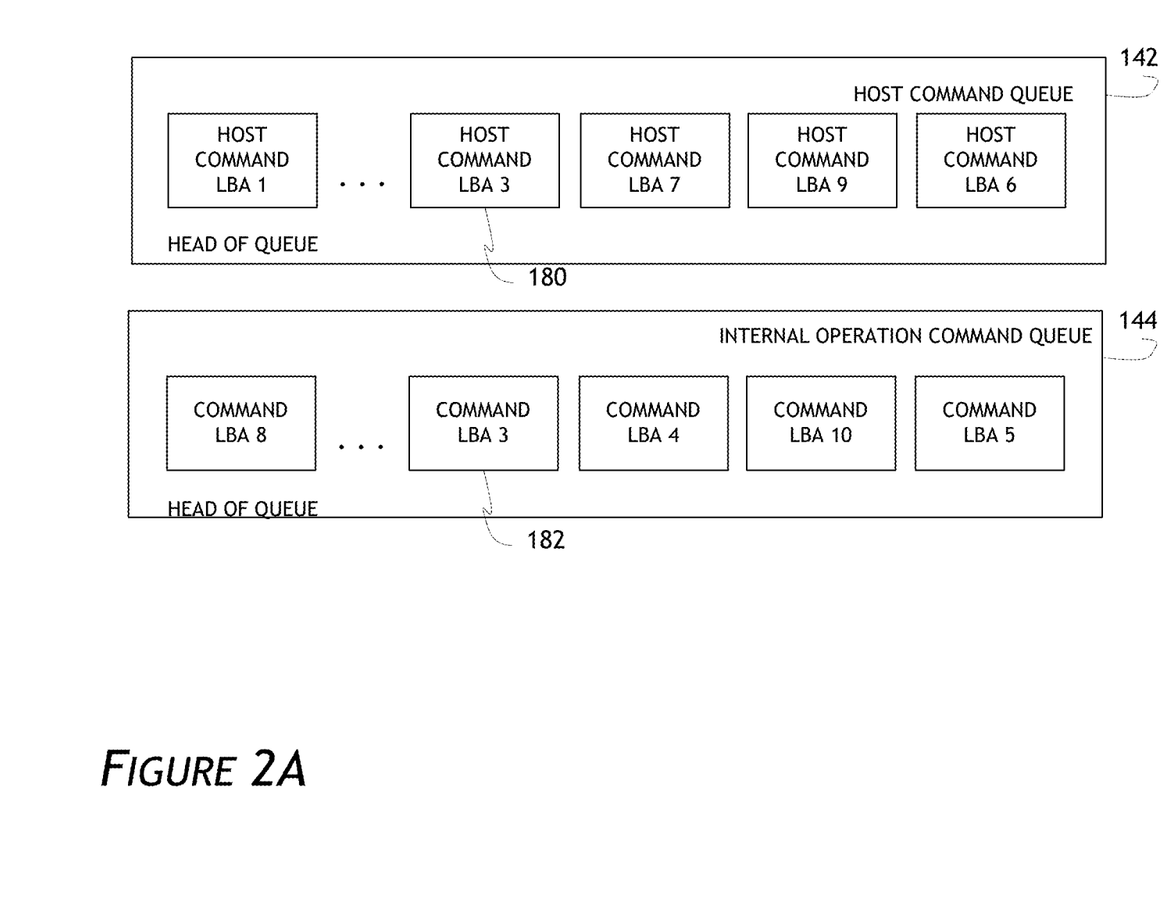
FIG. 2A shows an example of executing host-issued commands and internal commands according to one embodiment.

FIG. 2A is a block diagram illustrating an example of managing execution of memory commands. Although two queues are shown, the same management method can be applied to embodiments where commands are stored in one queue. Other embodiments may include more than two queues and the command execution management processes disclosed herein are applicable to those embodiments as well. In one embodiment, commands from both queues are concurrently processed and may be executed in a different order than the order in which the commands were originally placed into the respective queues. FIG. 2A also illustrates two commands 180 and 182 that are directed to the same LBA location (LBA 3), and embodiments of the invention are directed to maintaining data consistency while executing these commands, as further described below.

Figure 2B:
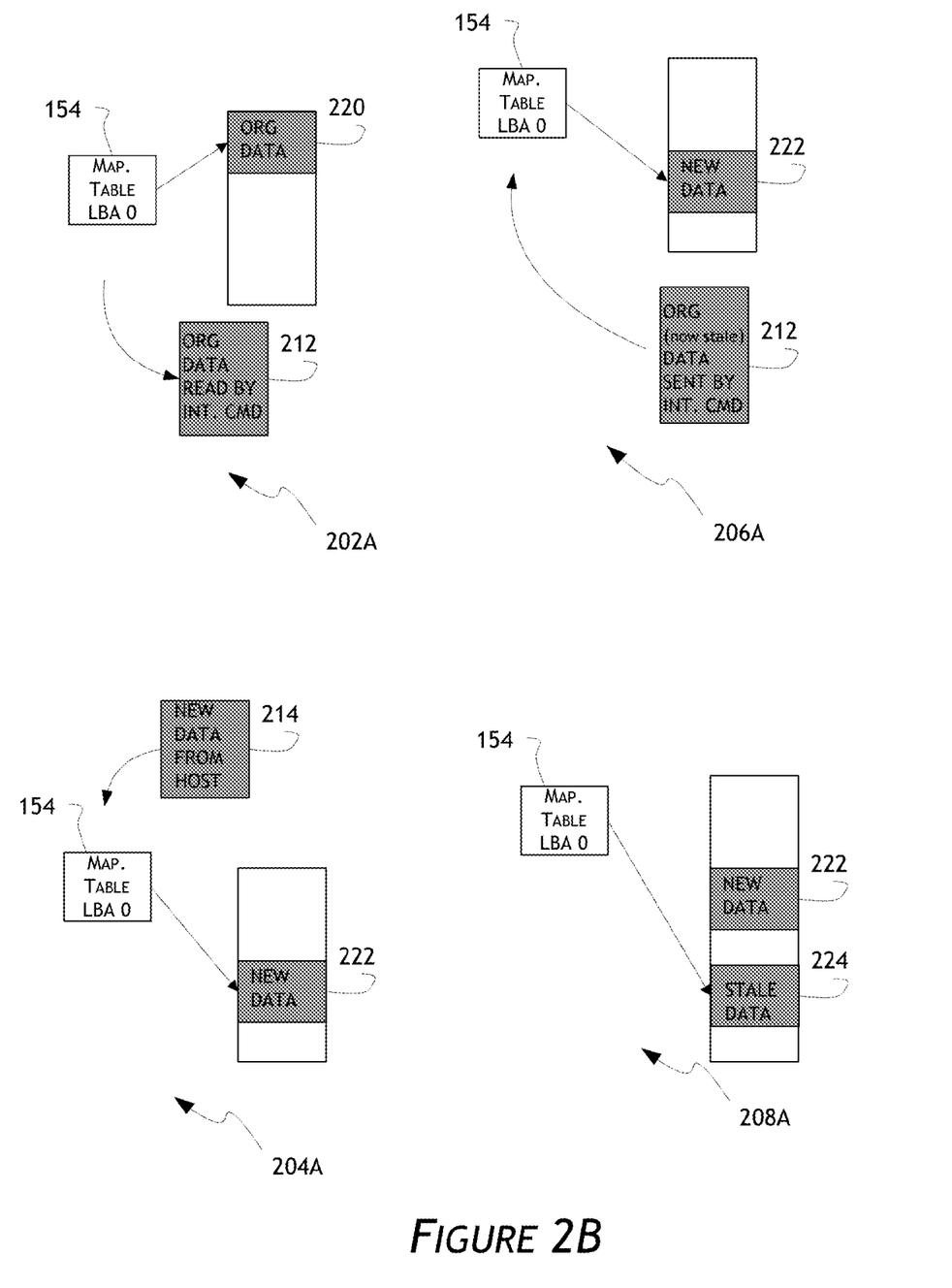
FIG. 2B shows an example risk of data consistency failure when host-issued commands are not synchronized with internal commands.

FIG. 2B shows an example risk of data consistency failure when host-issued commands are not synchronized with internal commands. As shown in FIG. 2B, host commands and internal commands that are directed to the same memory location (e.g. commands 180 and 182 shown in FIG. 2A) may be executed in a simultaneous or nearly simultaneous fashion. Illustration 202A shows an internal command 212 (e.g. a garbage collection command) reading data from a LBA 0 to copy the data to a new location. The LBA 0 entry in the mapping table 154 points to a physical address 220 at which the data is located. Illustration 204A shows a host-issued write command 214 writing to the same LBA 0 from which the internal command 212 has read data in illustration 202A. Illustration 204A shows that the mapping table 154 is updated to point to a physical address 222 at which the new data from the host is written. In illustration 206A, the internal command 212 attempts to complete the copy operation for the originally read data by updating the mapping table entry for LBA 0 to point to a new physical address. However, the original data is now stale because of the host write shown in illustration 204A. Without any synchronization, the internal command 212 is allowed to complete and illustration 208A shows the entry for LBA 0 in the mapping table 154 pointing to stale data at a physical address 224.

Figure 2C:
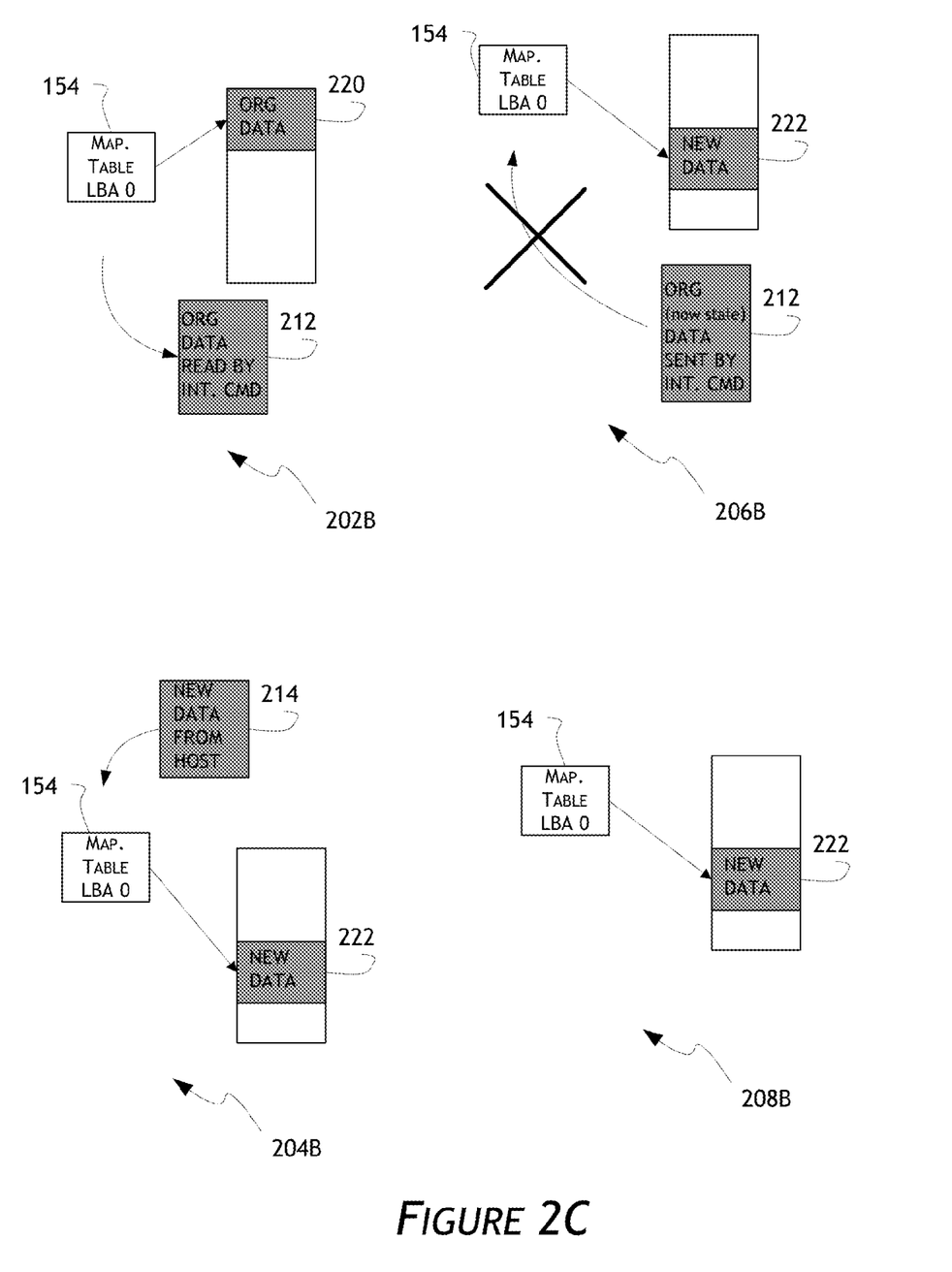
FIG. 2C illustrates an example of managing memory commands according to one embodiment.

FIG. 2C illustrates an example of managing memory commands according to one embodiment that eliminates the risk of failure illustrated in FIG. 2B by synchronizing host-issued write commands with internal commands such as garbage collection commands. Illustrations 202B and 204B in FIG. 2C are the same as their FIG. 2B counterparts 202A and 204, respectively. Illustration 206B shows that the command 212 is canceled as a result of the controller determining from the invalid page table 152 that the original data is no longer valid (stale) due to the host write in illustration 204B. In one embodiment, the invalid page table 152 indicates the validity status of data in the non-volatile memory arrays 160, and the controller is configured to cancel an internal command that attempts to write data indicated by the invalid page table as invalid. Illustration 208B shows that data consistency is preserved as a result of the cancellation, as the entry LBA 0 in the mapping table 154 continues to point to the new data written by the host.

Managing Write Locations

Figure 3A:
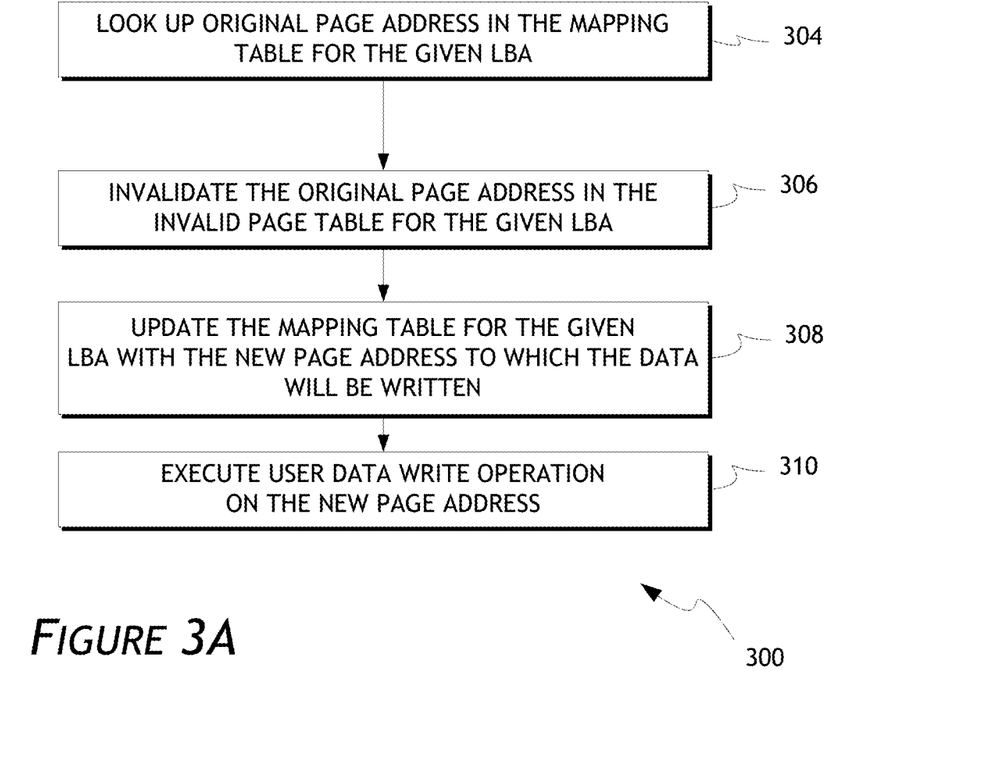
FIG. 3A is a flow diagram illustrating a method for managing memory commands in a solid-state storage subsystem according to one embodiment.

FIG. 3A is a flow diagram illustrating a method 300 for handling host-issued write commands in a solid-state storage subsystem according to one embodiment. In block 304, the controller 150 begins by looking up an original physical page address in the mapping table for a given LBA associated with a host-issued write command. Then in block 306, the controller 150 invalidates the original page address it obtained in block 304 in the invalid page table (e.g. by marking an entry with the original page address as invalid). Then in block 308, the controller updates the mapping table for the given LBA with the new physical page address at which the new data will be written at block 310. In block 310, the controller 150 executes the host write command on the new physical page address to write data there.

Figure 3B:
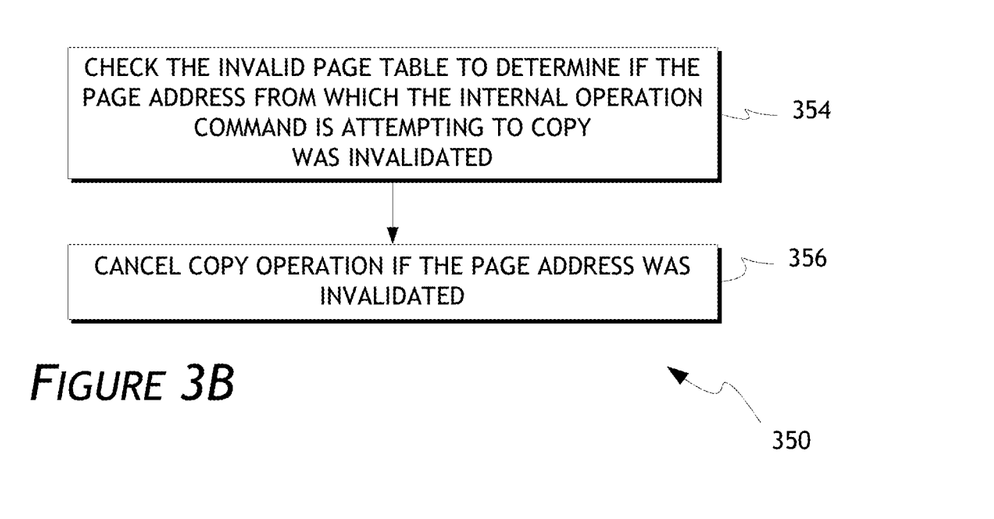
FIG. 3B is a flow diagram illustrating a method for managing memory commands in a solid-state storage subsystem according to one embodiment.

FIG. 3B is a flow diagram illustrating a method 350 for managing internal commands in a solid-state storage subsystem according to one embodiment. In one embodiment, the method 350 is performed by the controller 150 to determine whether a pending internal command should be executed. In block 354, the controller 150 checks the invalid page table to determine if the data at the physical page address from which the pending internal command is attempting to copy has been invalidated. For example, if an internal command is supposed to copy data located at a physical address "A" to a physical address "B," the controller would check the invalid page table to determine if the data at "A" has been invalidated. If the page address was invalidated, the controller 150 would cancel the internal copy command in block 356. In one embodiment, as an internal copy command includes a read and a write command, the check is performed prior to executing the read or the write command. In one embodiment, the check is performed prior to executing the write command. This checking and cancellation method prevents the writing of stale data. It would be apparent to one of ordinary skill in the art that the steps in FIGS. 3A and 3B could be performed in any appropriate order.

Figure 4:
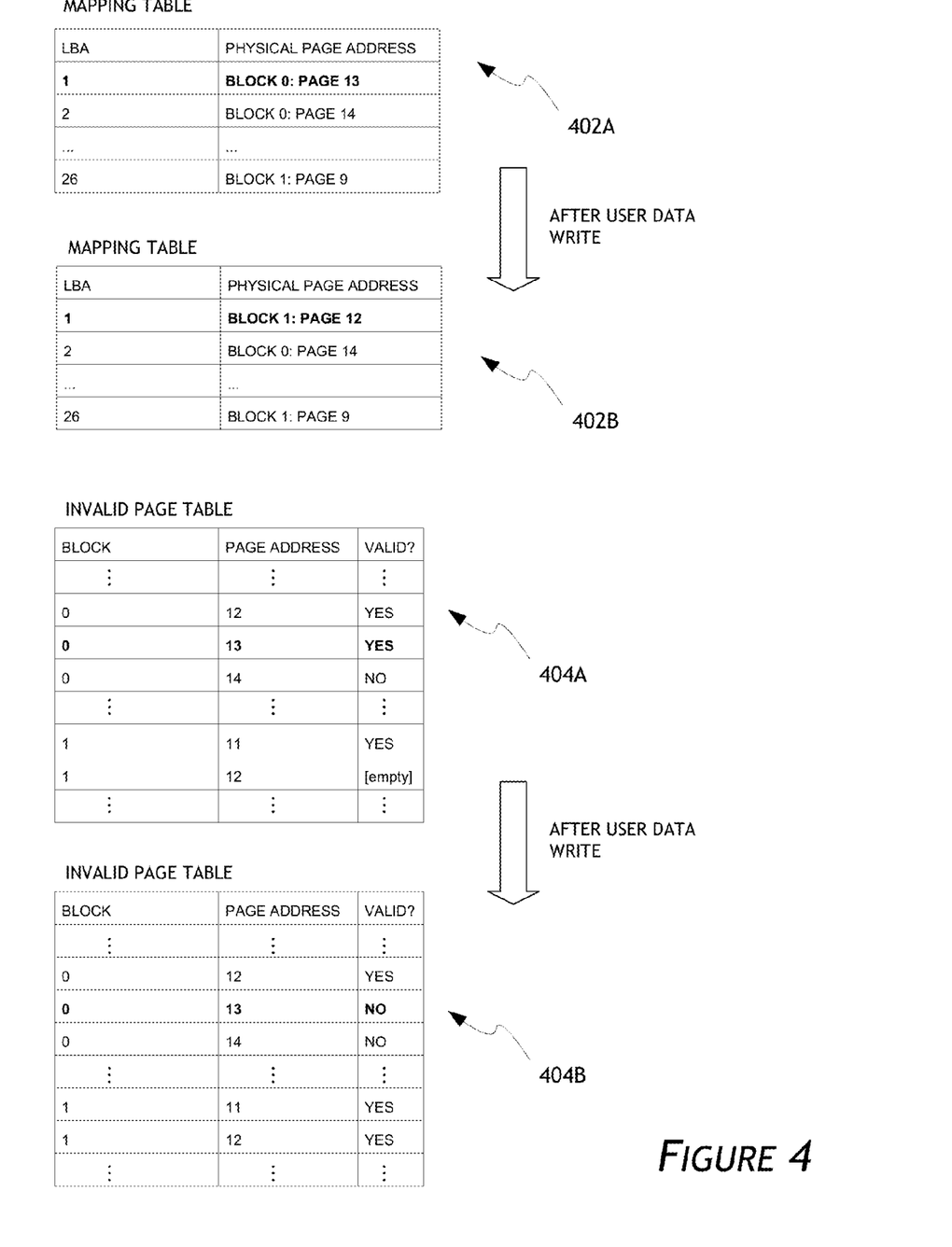
FIG. 4 illustrates an example mapping table and invalid table according to one embodiment.

FIG. 4 illustrates an example mapping table 402 and an example invalid page table 404 and the changes to both tables as a result of executing of a host-issued write command (a user data write command). The mapping table 402A shows the mapping table before the execution of the user data write command. As shown, each entry maps an LBA to a corresponding physical address. For example, LBA 2 is mapped to the address block 0, page 14. As previously shown in block 308 of FIG. 3A, the mapping table is updated prior to a host-issued (user) data write. Here in FIG. 4, after the user data write operation is completed, the mapping table 402B shows an entry has been updated to reflect the state of the memory after the user data write. In this particular example, LBA 1 has been updated from block 0, page 13, to block 1, page 12 (shown in bold).

FIG. 4 also shows changes to the invalid page table 404 as a result of executing the user data write command. The invalid page table 404A shows the table before the execution, with the entry for block 0, page 13 indicating the address as containing valid data. As previously shown in block 306 of FIG. 3A, the invalid page table is updated as the controller executes a user data write command. In the invalid page table 404B, the entry for block 0, page 13 is changed to invalid as a result of the user data write operation. This means that the data in block 0, page 13 is no longer valid, and any pending internal command for that address will be blocked from execution. This change in the invalid page table 404B is related to that shown in the mapping table 402B (LBA 0 now corresponding to block 1, page 12). Also, the entry for block 1, page 12, is changed from an un-initialized (or empty) value to valid.

In one embodiment, the validity value of a particular entry in the invalid page table can be "valid," "invalid," or an un-initialized value. In another embodiment, the validity value of a particular entry can be "valid" or "invalid." In one embodiment, the invalid page table is implemented as a bitmask, and a bit is used to represent the validity of data at a page address. In one embodiment, the mapping table is implemented as an array of physical chunk addresses, and an index into the array is used to represent logical addresses associated with the physical chunk addresses. In one embodiment, one or both of the data structures employ atomic transactions so that pending changes to the data structures must complete before additional data access requests can be processed. This ensures that multiple controller processes (e.g. one handling host commands and another handling internal commands) that are accessing the data structures can read the most current data, thus preventing a process from executing a command that overwrites valid data with invalid data.

CONCLUSION

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of managing memory operations in non-volatile solid-state memory, the method comprising:
    processing an internal command comprising a read data portion from a first physical page address and a write data portion to a second physical page address;
    executing the read data portion of the internal command;
    before executing the write data portion of the internal command, processing a write command from a host system for writing data to a logical address in the non-volatile solid-state memory, said processing comprising:
        locating, in a mapping table, a physical page address that corresponds to the logical address, the physical page address comprising the first physical page address;
        executing the write command to write data to a third physical page address;
        updating the physical page address in the mapping table with the third physical address; and
        updating an invalid page table with information related to the first physical page address; and
    cancelling the write data portion of the internal command if an entry in the invalid page table indicates that data at the first physical page address is invalid.

2. The method of claim 1, wherein updating the invalid page table comprises updating an entry in the invalid page table to indicate that data at the first physical page address is invalid.

3. The method of claim 1, wherein the invalid page table is implemented as a bitmask wherein a bit is used to represent a validity of data at a page address.

4. The method of claim 1, wherein the mapping table is implemented as an array of physical chunk addresses, wherein an index into the array is used to represent logical addresses associated with the physical chunk addresses.

5. The method of claim 1, wherein the write command is stored in a first queue.

6. The method of claim 1, wherein the internal command is stored in a second queue.

7. The method of claim 1, wherein the internal command comprises a garbage collection command.

8. The method of claim 1, wherein the internal command comprises a wear-leveling command.

9. The method of claim 1, wherein the mapping table and the invalid page table are separate tables.

10. A storage subsystem, comprising:
    a non-volatile solid-state memory array;
    a controller configured to process an internal command comprising a read data portion from a first physical page address and a write data portion to a second physical page address, and a write command from a host system for writing data to a logical address in the non-volatile solid-state memory array, the controller configured to maintain:
        a mapping table comprising a plurality of entries indicating correspondences between logical addresses and physical addresses in the non-volatile solid-state memory array; and
        an invalid page table comprising a plurality of entries indicating validity statuses of data at physical addresses in the non-volatile solid-state memory array,
    the controller further configured to:
        execute the read data portion of the internal command;
        before executing the write data portion of the internal command, process the write command;
        locate in the mapping table a physical page address that corresponds to the logical address, the physical page address comprising the first physical page address;
        execute the write command to write data to a third physical page address;
        update the physical page address in the mapping table with the third physical address; and
        update the invalid page table with information related to the first physical page address; and
        canceling the write data portion of the internal command if an entry in the invalid page table indicates that data at the first physical page address is invalid.

11. The storage subsystem of claim 10, wherein the controller is further configured to store the write command from the host system in a first queue.

12. The storage subsystem of claim 10, wherein the controller is further configured to store the internal command in a second queue.

13. The storage subsystem of claim 10, wherein the invalid page table is implemented as a bitmask wherein a bit is used to represent a validity of data at a page address.

14. The storage subsystem of claim 10, wherein the mapping table is implemented as an array of physical chunk addresses, wherein an index into the array is used to represent logical addresses associated with the physical chunk addresses.

15. The storage subsystem of claim 10, wherein the internal command comprises a garbage collection command.

16. The storage subsystem of claim 10, wherein the internal command comprises a wear-leveling command.

17. A method for managing the execution of write and internal memory commands, the method comprising:
    receiving an internal command and a write command;
    executing a read data portion of the internal command;
    determining that the internal command and the write command are directed to a common location; and
    before executing a write data portion of the internal command, processing the write command, said processing comprising:
        executing the write command to write data to a second location;
        updating a table with information related to the common location; and
        blocking the write data portion of the internal command from being performed if an entry in the table indicates that data at the common location is invalid, wherein at least said blocking is performed by a processor.

18. The method of claim 17, further comprising storing the internal command in a first queue.

19. The method of claim 18, further comprising storing the write command in a second queue.

20. The method of claim 18, wherein determining that the internal command and the write command are directed to a common location comprises determining that the internal command is related to data in a first physical address that was invalidated by the write command.

21. The method of claim 18, wherein the internal command is a garbage collection command.

22. The method of claim 17, wherein blocking the internal command comprises cancelling the internal command from being performed.

23. A storage subsystem, comprising:
a non-volatile solid-state memory array;
a controller configured to:
receive an internal command and a write command;
execute a read data portion of the internal command;
determine that the internal command and the write command are directed to a common location; and
before executing a write data portion of the internal command, process the write command, wherein the controller is further configured to process the write command by at least:
executing the write command to write data to a second location; and
updating a table with information related to the common location; and
the controller further configured to block the write data portion of the internal command from being performed if an entry in the table indicates that data at the common location is invalid.

24. The storage subsystem of claim 23, wherein the controller is further configured to store the internal command in a first queue.

25. The storage subsystem of claim 24, wherein the controller is further configured to store the write command in a second queue.

26. The storage subsystem of claim 24, wherein determining that the internal command and the write command are directed to a common location comprises determining that the internal command is related to data in a first physical address that was invalidated by the write command.

27. The storage subsystem of claim 24, wherein the internal command comprises a garbage collection command.

28. The storage subsystem of claim 24, wherein the internal command comprises a wear-leveling command.

29. The storage subsystem of claim 23, wherein blocking the internal command comprises cancelling the internal command from being performed.

* * * * *